US011885270B2

(12) United States Patent
Mercer et al.

(10) Patent No.: US 11,885,270 B2
(45) Date of Patent: Jan. 30, 2024

(54) ENERGY UTILIZATION SYSTEM

(71) Applicants: Michael D. Mercer, Edmond, OK (US); Ronald R. Mercer, Edmond, OK (US)

(72) Inventors: Michael D. Mercer, Edmond, OK (US); Ronald R. Mercer, Edmond, OK (US)

(*) Notice: Subject to any disclaimer, the term of this patent is extended or adjusted under 35 U.S.C. 154(b) by 0 days.

(21) Appl. No.: 17/949,899

(22) Filed: Sep. 21, 2022

(65) Prior Publication Data

US 2023/0086470 A1    Mar. 23, 2023

Related U.S. Application Data

(60) Provisional application No. 63/247,022, filed on Sep. 22, 2021.

(51) Int. Cl.
| | | |
|---|---|---|
| F02D 19/06 | (2006.01) | |
| F17C 5/00 | (2006.01) | |
| F02D 19/08 | (2006.01) | |
| F17C 3/00 | (2006.01) | |
| F02D 29/06 | (2006.01) | |

(52) U.S. Cl.
CPC ..... *F02D 19/0665* (2013.01); *F02D 19/0644* (2013.01); *F02D 19/085* (2013.01); *F02D 29/06* (2013.01); *F17C 3/005* (2013.01); *F17C 5/007* (2013.01); *F17C 2221/012* (2013.01); *F17C 2221/033* (2013.01); *F17C 2223/0123* (2013.01)

(58) Field of Classification Search
None
See application file for complete search history.

(56) References Cited

U.S. PATENT DOCUMENTS

| | | | | |
|---|---|---|---|---|
| 7,128,103 | B2 * | 10/2006 | Mitlitsky | H01M 8/04089 |
| | | | | 141/82 |
| 7,168,464 | B2 | 1/2007 | Diggins | |
| 7,497,191 | B2 * | 3/2009 | Fulton | H01M 8/0606 |
| | | | | 123/492 |
| 8,091,536 | B2 | 1/2012 | Munshi et al. | |
| 8,301,359 | B1 * | 10/2012 | Sagar | G05B 19/042 |
| | | | | 123/1 A |
| 8,418,732 | B2 * | 4/2013 | Cohen | G05D 11/132 |
| | | | | 141/94 |
| 8,459,213 | B2 * | 6/2013 | Moriarty | F03G 7/08 |
| | | | | 123/3 |
| 8,469,009 | B2 | 6/2013 | Munshi et al. | |

(Continued)

FOREIGN PATENT DOCUMENTS

| | | | | |
|---|---|---|---|---|
| CN | 212819205 | U * | 3/2021 | .......... B01F 15/0404 |
| CN | 114529056 | A * | 5/2022 | |

(Continued)

*Primary Examiner* — Kevin R Steckbauer
(74) *Attorney, Agent, or Firm* — Hall Estill Law Firm

(57) ABSTRACT

An energy utilization system can initially store a plurality of different fuels in a fuel storage pod before choosing a fuel ratio with a blend module connected to the fuel storage pod. The fuel ratio chosen in response to an electrical generation parameter tracked by the blend module. The supply of at least two of the plurality of different fuels to a power generator with the chosen fuel ratio allows for the combustion of the supplied fuels with the electrical power generator to create electricity.

20 Claims, 4 Drawing Sheets

(56) References Cited

U.S. PATENT DOCUMENTS

| | | | |
|---|---|---|---|
| 8,583,350 B1* | 11/2013 | Sagar | G05B 19/042 |
| | | | 290/51 |
| 9,287,178 B2 | 3/2016 | Li et al. | |
| 9,359,568 B2 | 6/2016 | Baustian et al. | |
| 9,739,919 B2 | 8/2017 | Zhang et al. | |
| 9,796,910 B2 | 10/2017 | Nevison | |
| 10,195,583 B2 | 2/2019 | Costantino et al. | |
| 2010/0107994 A1* | 5/2010 | Moriarty | F03G 7/08 |
| | | | 310/156.01 |
| 2023/0086470 A1* | 3/2023 | Mercer | F17C 3/005 |
| | | | 123/575 |
| 2023/0088217 A1* | 3/2023 | Mercer | F17C 5/007 |
| | | | 141/94 |

FOREIGN PATENT DOCUMENTS

| | | | | |
|---|---|---|---|---|
| CN | 217763522 U | * | 11/2022 | |
| CN | 115796323 A | * | 3/2023 | |
| EP | 2979743 A1 | * | 2/2016 | ............ B01D 53/22 |
| EP | 2979743 B1 | * | 10/2019 | ............ B01D 53/22 |
| ES | 2764389 T3 | * | 6/2020 | ............ B01D 53/22 |
| JP | 2000017470 A | * | 1/2000 | |
| JP | 2012082791 A | * | 4/2012 | |
| JP | 5735252 B2 | * | 6/2015 | |
| JP | 2021172631 A | * | 11/2021 | |
| WO | WO-2011050289 A2 | * | 4/2011 | ............ F03G 6/001 |

\* cited by examiner

ENERGY UTILIZATION SYSTEM

RELATED APPLICATIONS

The present application makes a claim of domestic priority under 35 U.S.C. 119(e) to U.S. Provisional Patent Application No. 63/247,022 filed Sep. 22, 2021, the contents of which are hereby incorporated by reference.

SUMMARY

An energy utilization system, in some embodiments, stores a plurality of different fuels in a fuel storage pod before choosing a fuel ratio with a blend module connected to the fuel storage pod. The fuel ratio chosen in response to an electrical generation parameter tracked by the blend module. The supply of at least two of the plurality of different fuels to a power generator with the chosen fuel ratio allows for the combustion of the supplied fuels with the electrical power generator to create electricity.

DETAILED DESCRIPTION

Assorted embodiments of the current disclosure are generally directed to a system that intelligently stores gases and subsequently supplies the respective gases as prescribed pressures to provide a fuel blend that provides optimized electrical power generation.

The generation of electricity has evolved with the incorporation of green sources of energy, such as solar, biomass, wind, and tidal harnessing. Meanwhile, the electrical grid that delivers power to consumers has evolved with sophisticated pricing and selection models that emphasize the ability of an electrical power generator to provide dynamic output. Hence, there is a goal to intelligently incorporate green sources of energy with electrical power generators to deliver power optimized for emissions and the sophisticated pricing and selection models often utilized by large-scale electrical power plants.

Accordingly, various embodiments employ a storage module that generates and executes a storage strategy involving the intelligent and dynamic storage of at least two different gases that can be blended into a fuel ratio by a blend module to allow electrical power generation with optimized efficiency, emissions, cost, and timing. The ability to store gases created from green sources of energy provide economical and environmentally friendly solutions while allowing downstream electrical power generators to enjoy increased performance due to the blend of the stored gases.

Figure 1:
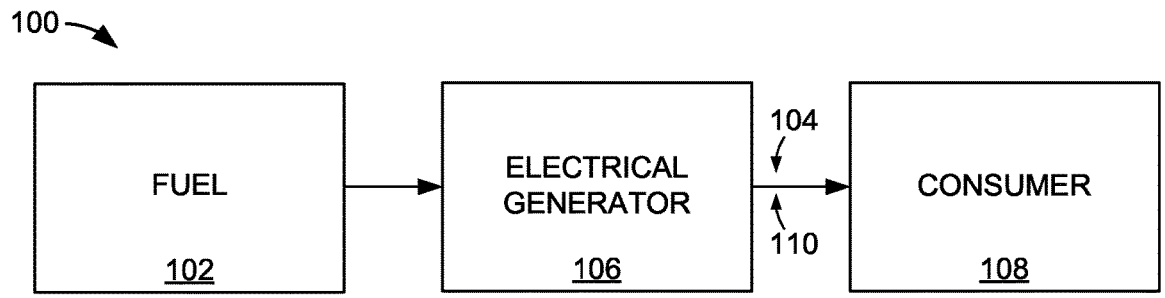
FIG. 1 is a block representation of an example electrical power generation environment in which assorted embodiments can be practiced.

FIG. 1 depicts portions of an example environment 100 in which embodiments of an energy utilization system can be practiced. The delivery of one or more fuels 102, such as coal, natural gas, steam, hydrogen, gasoline, or diesel, allows the conversion of fuel into electrical energy 104 by one or more generators 106. The consistent supply of fuels 102 over time provides electrical power to downstream consumers 108 via an electrical distribution grid 110. However, the cost and supply of fuels 102 can vary over time, which jeopardizes the performance and consistency of electrical energy 104 delivery to consumers 108.

As technology has allowed natural forces with intermittent supply, such as wind, water, and sun, to be converted to electricity, the emphasis on electrical energy 104 generation from combusted, or otherwise consumed, fuels 102 has been reduced. Yet, greater numbers of consumers 108 are connecting to the grid 110 and utilizing greater amounts of electricity, such as to power electrically powered vehicles. It is noted that the supply of blended fuels to an electrical generator is not required or limiting as some embodiments provide blended fuels to a combustion mechanism, such as a vehicle engine or heater.

Figure 2:
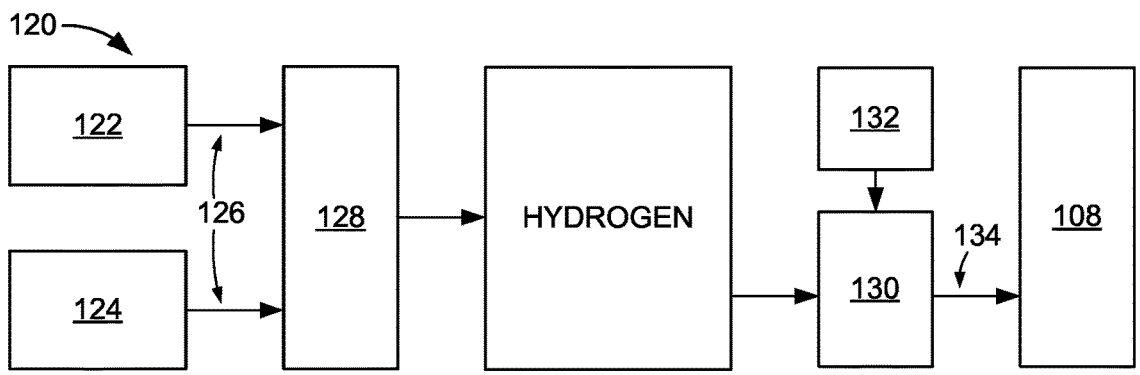
FIG. 2 depicts a block representation of an example electrical power generation system capable of being optimized in various embodiments.

FIG. 2 depicts an example energy utilization system 120 that employs natural forces to supplement fuel-consuming electricity generation. As shown, a wind turbine 122 and solar panel 124 respectively convert natural forces into electrical energy 126. While the produced electrical energy 126 may be consumed immediately, restrictions on electrical energy transmission often limit the amount of energy that can be consumed. Thus, some, or all, of the electrical energy 126 can be employed in an electrolysis operation 128 where water is converted into separate hydrogen ($H_2$) and oxygen ($O_2$) gases that can be stored and utilized at a later time. It is contemplated that some electrolysis operations 128 vent produced oxygen gas to simply store produced hydrogen, which can be more easily combusted than oxygen.

However, the storage and transportation of hydrogen gas is riddled with logistic complications and safety considerations that are inefficient. Despite such inefficiency, it is contemplated that hydrogen can be supplied to an electrical energy generator 130 alone, or in combination with other fuels 132, such as natural gas, to be consumed in the creation of electricity 134 that is delivered to downstream consumers 108. The supplementation of other fuels 132 with hydrogen gas produced from natural forces can be beneficial, but can be cost prohibitive, particularly when the cost of maintenance of the energy capturing devices (122/124) is added to the transportation and storage of hydrogen.

Figure 3:
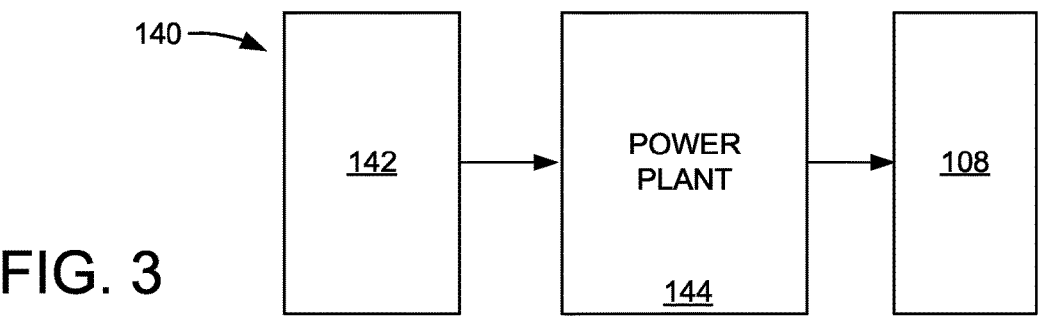
FIG. 3 represents a block representation of portions of an example electrical power generation system arranged in accordance with some embodiments.

FIG. 3 depicts a block representation of portions of an example energy utilization system 140 where one or more fuels 142 are supplied to a combustion mechanism 144, such as a power plant or vehicle, to be converted into electrical/mechanical energy that can be employed by downstream consumers 108. While the combustion mechanism 144 may produce electricity at any volume, pricing and availability models imposed by regulatory agencies create dynamic profitability structures for the translation of fuels 142 into electricity. Hence, the static capabilities of power plant combustion mechanisms 144 to produce electricity in certain volumes at unmitigated costs limits the profitability, even with the inclusion of fuels sourced from cheaper origins, such as hydroelectric, wind, and solar devices that have intermittent supply.

Figure 4:
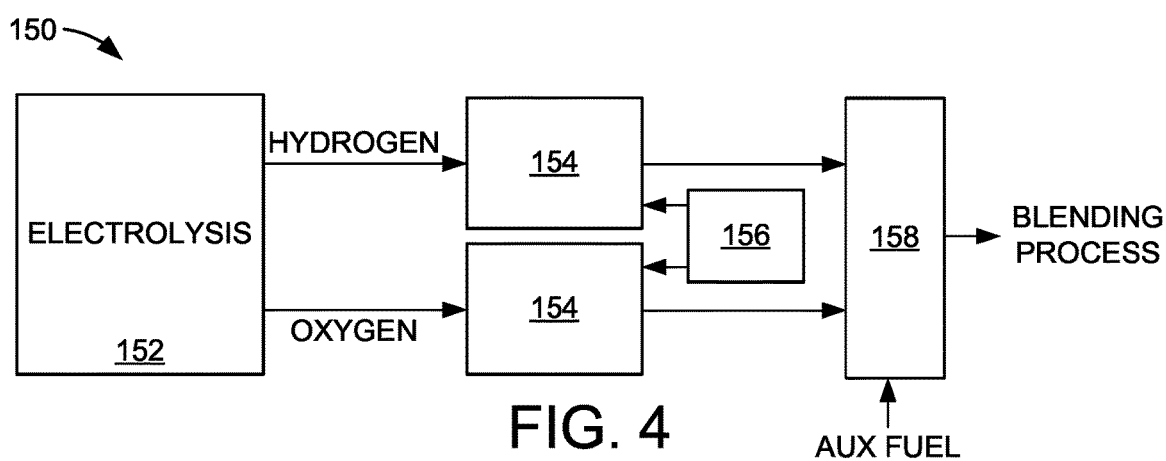
FIG. 4 conveys a block representation of an example power utilization system configured in accordance with assorted embodiments.

FIG. 4 depicts a block representation of an example energy utilization system 150 configured in accordance with various embodiments to provide optimized delivery of fuels and generation of electricity by a fuel combustion mechanism 144. Although not required or limiting, electrolysis 152 can be used to convert electrical power into separate hydrogen and oxygen gases that are safely transported close to the mechanism 144 where they are respectively stored in interconnected storage pods 154. A storage module 156 intelligently manages the volume and pressure of the respective gases to ensure the availability for the power plant 144.

It is contemplated that hydrogen and oxygen are delivered directly to the combustion mechanism 144, but some embodiments blend the respective gases to provide a fuel ratio selected by a blend module 158 that provides optimal electrical power generation, emissions, timing, and cost. As a result of the intelligent storage and blending of gases produced from natural forces, the combustion mechanism 144 can enjoy cost mitigation of other fuels, such as natural gas, along with the ability to employ dynamic electrical power generation timing and volume due to the selected fuel blend. In some embodiments, the storage module 156 selects where to deliver gases, such as to vehicles powered by hydrogen.

Figure 5:
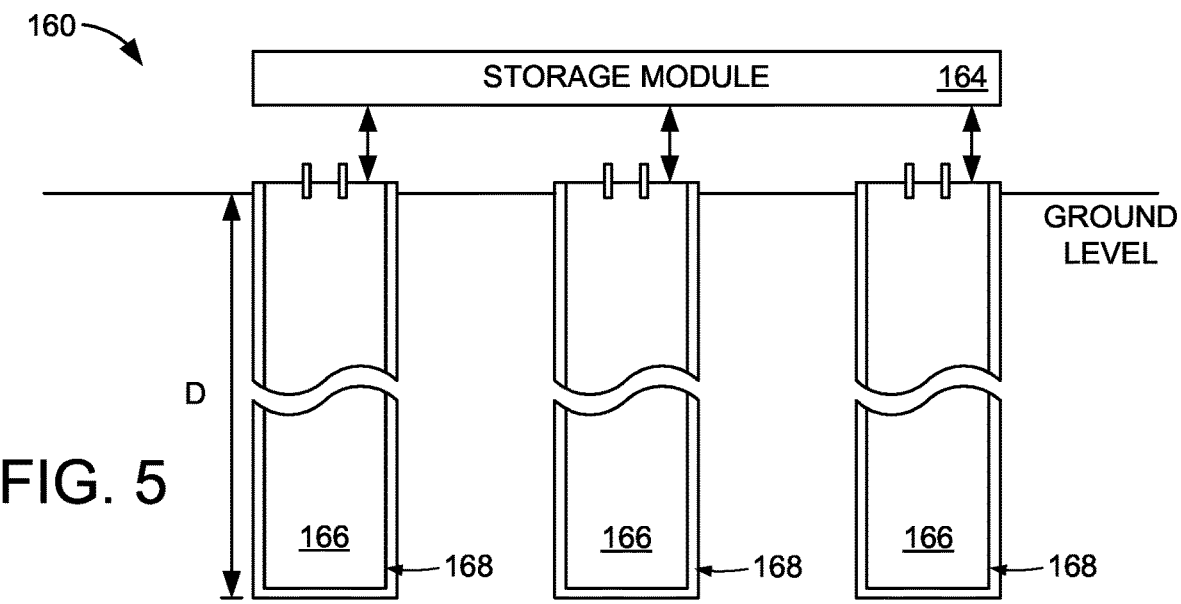
FIG. 5 depicts a line representation of portions of an example power utilization system employed in accordance with various embodiments.

FIG. 5 illustrates portions of an example energy utilization system 160 where a storage pod 162 is connected to a storage module 164 that employs at least a controller and storage circuit to generate a storage strategy that is executed to maintain the availability of at least two different gases, such as hydrogen and oxygen, for a downstream power plant. Although not required or limiting, a storage pod 162 can consist of multiple individual vessels 166 that are each extend a depth (D) underground for safety and efficiency of space. That is, above ground tanks/vessels may be utilized, but take up large volumes of space and provide safety concerns that are highly mitigated by the positioning of vessels 166 below ground.

The respective vessels 166 may be constructed with interchangeable sleeves 168 that allow for the mitigation of material embrittlement while providing an increased degree of safety compared to vessels without interchangeable internal materials. The separation of vessels 166 allows the storage module 164 to alter what gases is stored and at what pressure the gas is to be kept, which provides the ability to dynamically adjust to power plant demand to increase electricity generation efficiency and performance while decreasing emissions compared to combustion of a single fuel source.

Figure 6:
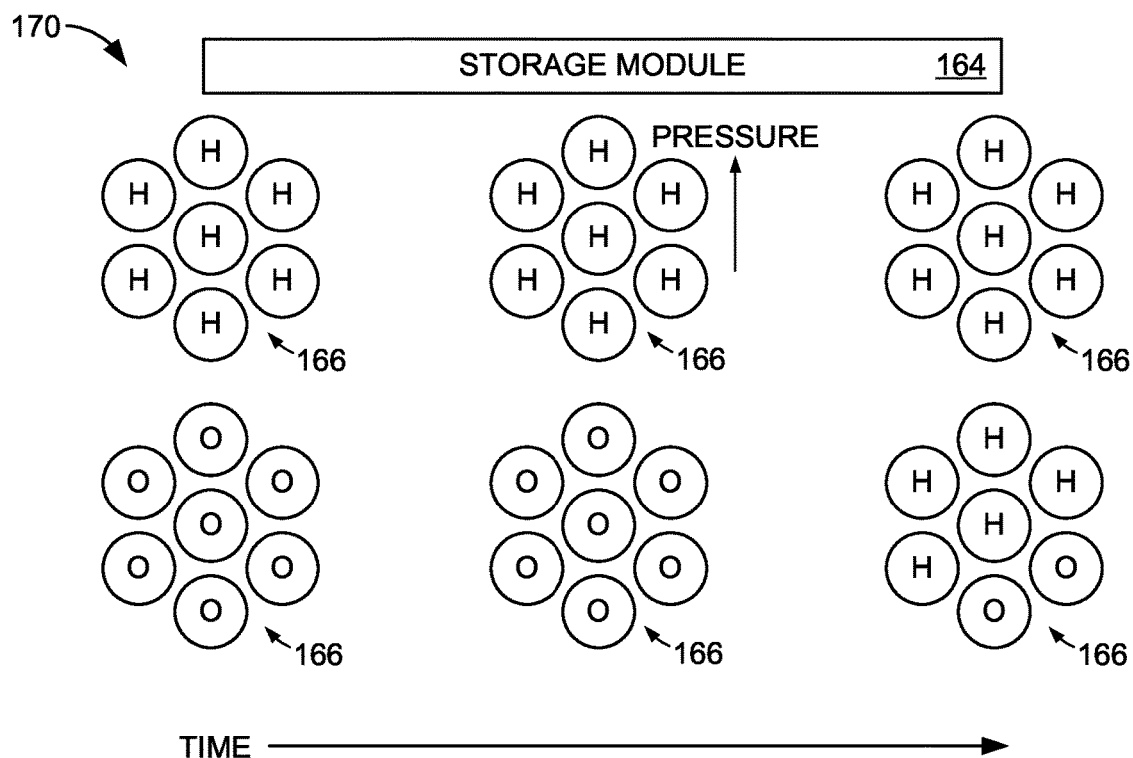
FIG. 6 conveys a line representation of portions of an example power utilization system operated in accordance with some embodiments.

FIG. 6 depicts an example storage pod 170 utilized by a storage module 164 over time in accordance with some embodiments. Initially, the storage module 164 directs equal volumes of hydrogen (H) and oxygen (O) to be stored in the respective vessels 166. In response to demand, cost, and/or vessel maintenance, the storage module 164 can choose to store more hydrogen than oxygen by increasing the pressure of some vessels and/or utilizing more vessels 166 for hydrogen than for oxygen. The storage module 164 may further adjust the ratio of volume of stored hydrogen to volume of stored oxygen by changing the number of vessels 166 storing hydrogen, as shown.

Figure 7:
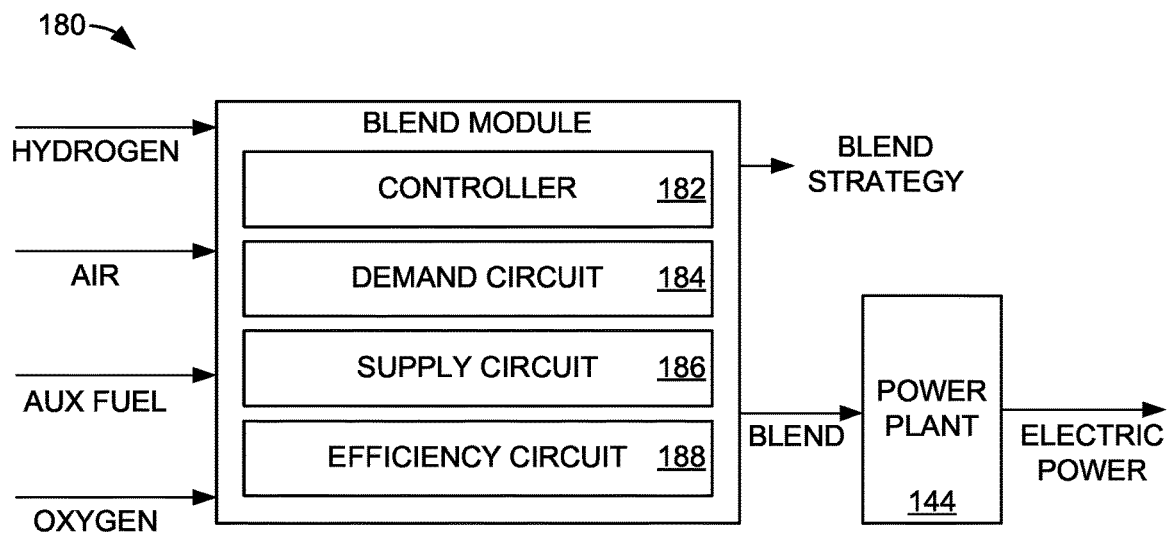
FIG. 7 shows a block representation of portions of an example power utilization system configured in accordance with assorted embodiments.

By intelligently altering the pressure and/or gas stored in a vessel, the storage module 164 can mitigate vessel embrittlement and adapt to changing electricity generation conditions, such as cost, demand, and timing. The addition of intelligent blending of gases can complement the intelligent storage of gases to optimize the operation of a power plant. FIG. 7 depicts a block representation of an example blend module 180 that can employ a controller 182 to generate and execute a blending strategy that provides a predetermined fuel ratio to one or more electrical energy generators.

The blend module 180 can have a demand circuit 184 that evaluates past, current, and predicted future demand for fuels to provide the blend strategy with prescribed volumes of fuels that can be consistently and reliably supplied. The demand circuit 184 allows the blend strategy to be practical and executable without undue delay from lack of fuel supply. Use of the demand circuit 184, in some embodiments, can manage fuel nominations, which can provide a physical hedge. The accurate understanding of dynamic demand, via the demand circuit 184, can allow the blend module 180 to selectively take fuel from a supply line and/or existing tank to meet demand with proper fuel volume, fuel pressure, and mitigated fuel costs, such as during peak demand conditions.

A supply circuit 186 can operate with the storage module of a system to determine the real-time and future fuel supply capabilities of a system, which corresponds with the ability of the blend module 180 to provide a fuel ratio prescribed by the blending strategy. The fuel ratio that provides optimized electrical generation efficiency and cost can be determined by an efficiency circuit 188 that evaluates environmental conditions as well as the operating performance of an electrical generator. The efficiency circuit 188 can set different fuel ratios correlating to any number of factors, such as cost of auxiliary fuel (natural gas), dynamic operating parameters of a generator, and humidity of ambient air, to provide fuel at minimal cost without jeopardizing electrical generation timing, emissions, speed, or efficiency.

With the blending strategy proactively setting different fuel ratios correlated to different detected, or predicted, electrical generation parameters, along with the consideration for fuel cost, emissions, electrical grid selection, and electricity pricing models, the blend module 180 can provide quick and dynamic adjustments to the storage and/or supply of fuels to maintain electrical power generation at the lowest cost and highest possible efficiency. The blend may also be optimized for other machines employing turbines, such as jet engines, to increase operational efficiency while decreasing fuel cost.

Alternatively, the blending strategy can be optimized for non-electrical power plant usage, such as in internal combustion engines, locomotives, or industrial equipment. In other words, the blend of fuels and air can be optimized by the blend module for combustion engines due to the relatively high octane rating of auxiliary fuels, such as natural gas, and the ability to mitigate unburned hydrocarbons by blending pure hydrogen. It is noted that hydrogen burns relatively quickly for a large concentration range, such as 5-75%, which results in a faster, more complete, and more efficient burn for combustion engines of all displacements. As an another non-limiting example, the blend could be optimized for large vessels, such as trains or ships, by utilizing more pure oxygen that causes diesel engines to operate more efficiently and with reduced emissions.

Figure 8:
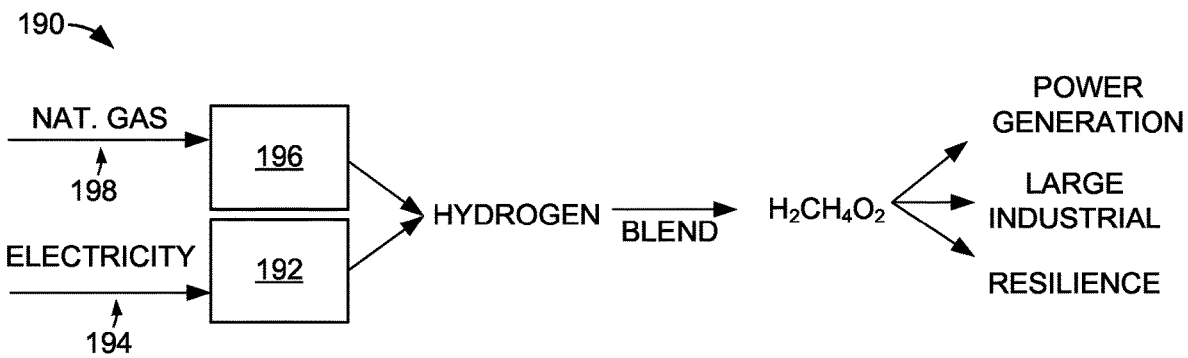
FIG. 8 depicts a block representation of a blending procedure that can be carried out by an energy utilization system in some embodiments.

FIG. 8 depicts a block representation of an example blending procedure 190 that can be carried out by the blend module 180 in accordance with some embodiments. Through the transformation of water into hydrogen via electrolysis 192 from electricity from natural forces 194, such as wind, water, geothermal, or solar energy, or via steam methane reforming 196 from one or more natural gas sources 198, the blend strategy is conducted to create a predetermined mixture of different gases, which can be defined as a molar gas fraction.

The predetermined blend of gases can be selected with respect to the operational parameters of a power generator, such as a blend that decreases maintenance demand or operational stress on generator components, or selected with respect to the cost per unit of electricity generated. While not limiting, the intelligent modification of the mixture of gases in accordance with a predetermined blending strategy allows for optimal cost, operational efficiency, or speed for various purposes, such as power generation, industrial combustion, residential heating, and vehicle operation.

Figure 9:
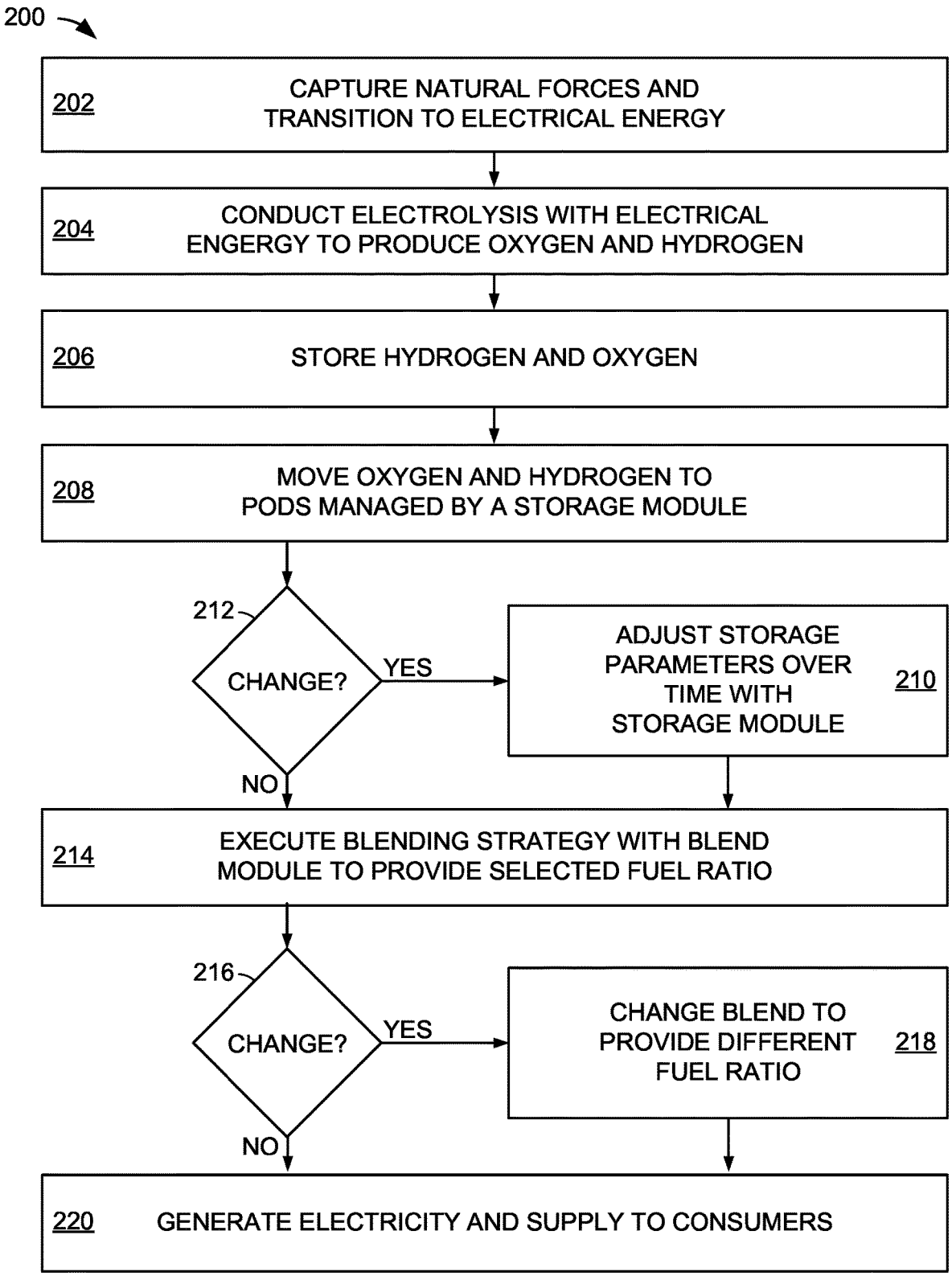
FIG. 9 conveys an example power utilization routine that may be employed by the various embodiments of FIGS. 1-7.

FIG. 9 is a flowchart of an example energy utilization routine 200 that can employ assorted embodiments of FIGS. 1-8. Natural forces are captured in step 202 and transitioned into electrical energy that is immediately utilized in one or more electrolysis operations in step 204 to create hydrogen gas and oxygen gas that are each captured and stored in step 206. It is noted that additional fuels, such as propane, butane, methane, and hexane, can be concurrently stored in storage vessels of one or more storage pods.

Via one or more transportation means, step 208 moves the stored gases each to vessels of a storage pod connected to a storage module. The storage module dynamically adjusts the gas storage parameters, such as pressure and/or ratio of stored gas volumes, over time in step 210 in response to decision 212 determining a change in supply, cost, and/or demand is imminent or predicted. At the conclusion of step 210, or in the event decision 212 does not prompt a change in storage parameters, step 214 executes a blending strategy to provide a fuel ratio from the storage pod to a power plant to allow for the generation of electrical energy. Decision 216 evaluates if changes to electricity demand and/or pricing has changed. If so, step 218 changes to a different fuel ratio of the blending strategy.

It is also contemplated that step 218 can alter the fuel ratio in response to other detected or predicted conditions, such as supply of fuel, cost of fuel, or operating parameters of power plant generators. With the optimal fuel ratio, step 220 can proceed to generate electricity that is supplied to consumers via a power grid. Accordingly, the blend module can provide a dynamic fuel ratio that adapts to changing supply, demand, and use conditions to ensure maximum fuel delivery performance at the best possible cost. Through the assorted embodiments of a fuel storage and blending system, multiple fuels can be safely and efficiently stored at pressures that allow for intelligent fuel blends to be consistently delivered with at least threshold pressure for a predetermined amount of time, such as one minute, one hour, or multiple hours.

The assorted embodiments of an energy supply, storage, and blending system, described herein, provides intelligent storage of gases that can be utilized to generate electricity and the intelligent blending of fuels to optimize operational performance and cost. The storage module can provide dynamic volumes and pressures for gas storage that can mitigate and/or prevent material embrittlement as well as maintain optimal supply of gases for blending and power generation purposes. The ability to interchange sleeves of a gas storage vessel further combats embrittlement without incurring large costs associating with replacing the entirety of a vessel. The operation of the blend module provides intelligent adaptations to changing cost, demand, supply, and operational efficiencies through the dynamic fuel ratio selection.

What is claimed is:

1. An apparatus comprising:
a combustion mechanism configured to enact a combustion process to convert input fuel to energy in a form that can be used by a downstream consumer;
a storage module comprising a storage controller circuit configured to establish a first ratio of total volumes of hydrogen (H2) and oxygen (O2) obtained from an electrolysis process to be stored in respective pressurized storage vessels of a fuel storage pod adjacent the combustion mechanism, the first ratio selected by the storage controller circuit in relation to a predicted demand of the combustion mechanism for a first mixture of the H2 and the O2 in proportions corresponding to the first ratio; and
a blend module connected to the fuel storage pod, the blend module comprising a blend controller circuit configured to adjust the first ratio to a different, second ratio in response to an imminent demand of the combustion mechanism, the blend module outputting a flow of the input fuel to the combustion mechanism at a different, second mixture of the H2 and the O2 from the fuel storage pod in proportions corresponding to the second ratio selected in relation to at least one combustion process parameter.

2. The apparatus of claim 1, wherein the first ratio is established responsive to at least one gas storage parameter associated with the predicted demand of the combustion mechanism by the storage controller circuit selecting respective numbers of the pressure vessels to store the H2 and the O2 and associated pressures at which the H2 and the O2 are stored therein.

3. The apparatus of claim 1, wherein the fuel storage pod comprises a plurality of the pressurized vessels as separate storage vessels each residing below a ground level.

4. The apparatus of claim 1, wherein the second ratio established by the blend module controller provides a mixture of the H2, the O2 and an additional fuel supplied from a secondary storage vessel to the combustion mechanism.

5. The apparatus of claim 1, wherein the at least one combustion parameter used to establish the second ratio comprises an environmental parameter adjacent the combustion mechanism.

6. The apparatus of claim 5, wherein the environmental parameter comprises an ambient humidity.

7. A method comprising:
storing hydrogen (H2) and oxygen (O2) in different pressurized vessels of a fuel storage pod in a storage ratio in terms of total respective volumes corresponding to a predicted demand for input fuel to a combustion mechanism at a first corresponding mixture of the H2 and the O2, the storage ratio established by a storage controller circuit of a storage module;
choosing a fuel ratio with a controller of a blend module connected to the fuel storage pod in response to an electrical generation parameter associated with an imminent demand by the combustion mechanism, the fuel ratio providing a modified, second corresponding mixture of the H2 and the O2 as compared to the storage ratio; and supplying the modified, second corresponding mixture of the H2 and the O2 to the combustion mechanism for combustion thereby to generate electricity.

8. The method of claim 7, wherein electrical generation parameter is an aggregate cost of fuels to produce an amount of electricity, the aggregate cost of fuels computed by the blend module.

9. The method of claim 7, wherein the electrical generation parameter is an electricity demand computed by the blend module.

10. The method of claim 7, wherein the fuel ratio corresponds with multiple fuels of the plurality of different fuels provided to the power generator at a pressure selected by the blend module.

11. The method of claim 7, wherein the electrical generation parameter is a volume of emissions produced by the power generator in the combustion of the supplied fuels, the volume of emissions computed by the blend module.

12. The method of claim 7, wherein the storage ratio is established responsive to at least one gas storage parameter associated with the predicted demand of the combustion mechanism by the storage controller circuit selecting respective numbers of the pressure vessels to store the H2 and the O2 and associated pressures at which the H2 and the O2 are stored therein.

13. The method of claim 12, wherein the electrolysis operation utilizes electricity produced from a non-continuous renewable energy source.

14. The method of claim 7, wherein the fuel ratio is altered by the blend module over time in response to changes in the electrical generation parameter calculated by the blend module.

15. The method of claim 7, wherein the fuel ratio is altered by the blend module over time in response to changes in the electrical generation parameter predicted by the blend module.

16. A method comprising:
storing a plurality of different fuels in a fuel storage pod in a first ratio in terms of total accumulated volumes responsive to a gas storage parameter associated with predicted fuel mixture requirements of a combustion mechanism, the plurality of different fuels comprising hydrogen (H2) and oxygen (O2) which are respectively stored in respective numbers of pressurized vessels of the fuel storage pod established in relation to the first ratio;

generating a blend strategy using a controller of a blend module connected to the fuel storage pod, the blend strategy prescribing multiple different fuel ratios for different volumes of electricity demand;

choosing a fuel ratio with the blend module in response to an electrical generation parameter chosen by the blend module associated with an imminent demand of the combustion mechanism and at least one existing environmental parameter;

supplying at least two of the plurality of different fuels to a power generator with the chosen fuel ratio; and combusting the supplied fuels with the combustion mechanism to generate electricity.

17. The method of claim 16, wherein the first ratio is established responsive to at least one gas storage parameter associated with the predicted demand of the combustion mechanism by a storage controller circuit which selects different numbers of the pressure vessels to store the H2 and the O2 and different associated pressures at which the H2 and the O2 are stored therein in relation to the first ratio.

18. The method of claim 16, wherein the blend strategy and constituent different fuel ratios are generated proactively and prior to supplying fuel from the fuel storage pod to the combustion mechanism.

19. The method of claim 16, wherein the blend strategy prescribes supplying fuels from different fuel storage pods to the combustion mechanism.

20. The method of claim 16, wherein the blend module supplies different fuel ratios to the power generator over time in response to changes in fuel cost detected by the blend module.

* * * * *